(12) United States Patent
Sivagnanam et al.

(10) Patent No.: US 10,902,323 B2
(45) Date of Patent: Jan. 26, 2021

(54) BOT FRAMEWORK

(71) Applicant: SAP SE, Walldorf (DE)

(72) Inventors: Natesan Sivagnanam, Tamil Nadu (IN); Abhishek Jain, Faridabad (IN)

(73) Assignee: SAP SE, Walldorf (DE)

( * ) Notice: Subject to any disclaimer, the term of this patent is extended or adjusted under 35 U.S.C. 154(b) by 777 days.

(21) Appl. No.: 15/675,608

(22) Filed: Aug. 11, 2017

(65) Prior Publication Data

US 2019/0050738 A1    Feb. 14, 2019

(51) Int. Cl.
| | |
|---|---|
| *G06N 5/00* | (2006.01) |
| *G06N 20/00* | (2019.01) |
| *G06N 3/00* | (2006.01) |
| *G06F 16/903* | (2019.01) |
| *G06F 16/00* | (2019.01) |

(52) U.S. Cl.
CPC ............ *G06N 5/003* (2013.01); *G06F 16/00* (2019.01); *G06F 16/90335* (2019.01); *G06N 3/006* (2013.01); *G06N 20/00* (2019.01)

(58) Field of Classification Search
CPC .... G06F 40/284; G06F 16/3334; G06F 40/30; G06F 16/90335; G06F 16/00; G06K 9/6215; H04L 51/02; G06N 3/08; G06N 5/003; G06N 20/00; G06N 3/006
See application file for complete search history.

(56) References Cited

U.S. PATENT DOCUMENTS

| | | | |
|---|---|---|---|
| 10,219,122 B1* | 2/2019 | Scanlon | H04L 51/20 |
| 2009/0157408 A1* | 6/2009 | Kim | G10L 13/08 704/260 |
| 2015/0294377 A1* | 10/2015 | Chow | G06Q 30/0282 705/347 |
| 2016/0098386 A1* | 4/2016 | Rangarajanidhar Sridhar | G06F 40/232 704/9 |
| 2017/0228367 A1* | 8/2017 | Pasupalak | G06F 40/20 |
| 2018/0068031 A1* | 3/2018 | Hewavitharana | G06F 40/295 |
| 2018/0137551 A1* | 5/2018 | Zheng | G06K 9/00442 |
| 2018/0174020 A1* | 6/2018 | Wu | G06N 3/08 |
| 2018/0276273 A1* | 9/2018 | Mittal | G06F 16/243 |
| 2018/0375947 A1* | 12/2018 | Hodges | H04L 67/10 |
| 2019/0042988 A1* | 2/2019 | Brown | G06Q 10/0631 |
| 2019/0102078 A1* | 4/2019 | Bhatt | G06F 3/04847 |
| 2019/0258967 A1* | 8/2019 | Gonzalez | G06Q 50/14 |
| 2020/0057946 A1* | 2/2020 | Singaraju | G06N 5/041 |
| 2020/0192978 A1 | 6/2020 | Sivagnanam | |

* cited by examiner

*Primary Examiner* — Mohammad K Islam
(74) *Attorney, Agent, or Firm* — Mintz Levin Cohn Ferris Glovsky and Popeo, P.C.

(57) ABSTRACT

Methods and apparatus, including computer program products, are provided for a bot framework. In some implementations, there may be provided a method which may include receiving a request comprising a text string, the request corresponding to a request for handling by a bot; generating, from the request, at least one token; determining whether the at least one token matches at least one stored token mapped to an address; selecting the address in response to the match between the at least one token and the at least one stored token; and presenting, at a client interface associated with the bot, data obtained at the selected address in order to form a response to the request. Related systems, methods, and articles of manufacture are also disclosed.

11 Claims, 6 Drawing Sheets

BOT FRAMEWORK

FIELD

The subject matter described herein generally relates bots.

BACKGROUND

The term "bot" refers to a software-based robot that performs at least one automated task. For example, a bot may be deployed to perform a simple task, while more complex bots, such as chatbots, can be deployed at a help desk or call center to simulate an actual human being responding to questions.

BACKGROUND

In some implementations, methods and apparatus, including computer program products, are provided for a bot framework.

In some implementations, there may be provided a method which may include receiving a request comprising a text string, the request corresponding to a request for handling by a bot; generating, from the request, at least one token; determining whether the at least one token matches at least one stored token mapped to an address; selecting the address in response to the match between the at least one token and the at least one stored token; and presenting, at a client interface associated with the bot, data obtained at the selected address in order to form a response to the request.

In some variations, one or more of the features disclosed herein including the following features can optionally be included in any feasible combination. The method may further include accessing, at the selected address, the data in order. In response to not having a match between the at least one token and the at least one stored token, the method may further include determining whether at least one other token is a near match, selecting the corresponding address for the at least one other token, and accessing corresponding data at the corresponding address. The near match may be learned by adding the at least one other token to a database of stored tokens mapped to addresses. The learning may be performed by a machine learning node coupled to the bot, and the machine learning node may be further coupled to the database storing the stored tokens mapped to the addresses. The stored tokens may be obtained from prior requests to enable the learning. At the client interface associated with the bot, the corresponding data may be presented and an indication which when selected indicates the corresponding data is responsive to the request. The learning may be triggered by the indication being selected at the client interface which can be used to decide better for future requests.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

DETAILED DESCRIPTION

Bots generally require customized implementations, so that deploying bots across a wide range of applications can require a considerable amount of integration and customization for each bot and corresponding application interacting with the bot. In some example implementations, there may be provided a bot framework that can be deployed across a variety applications. Moreover, the bot framework may include a machine learning implementation and may enable integration with other bots.

Figure 1:
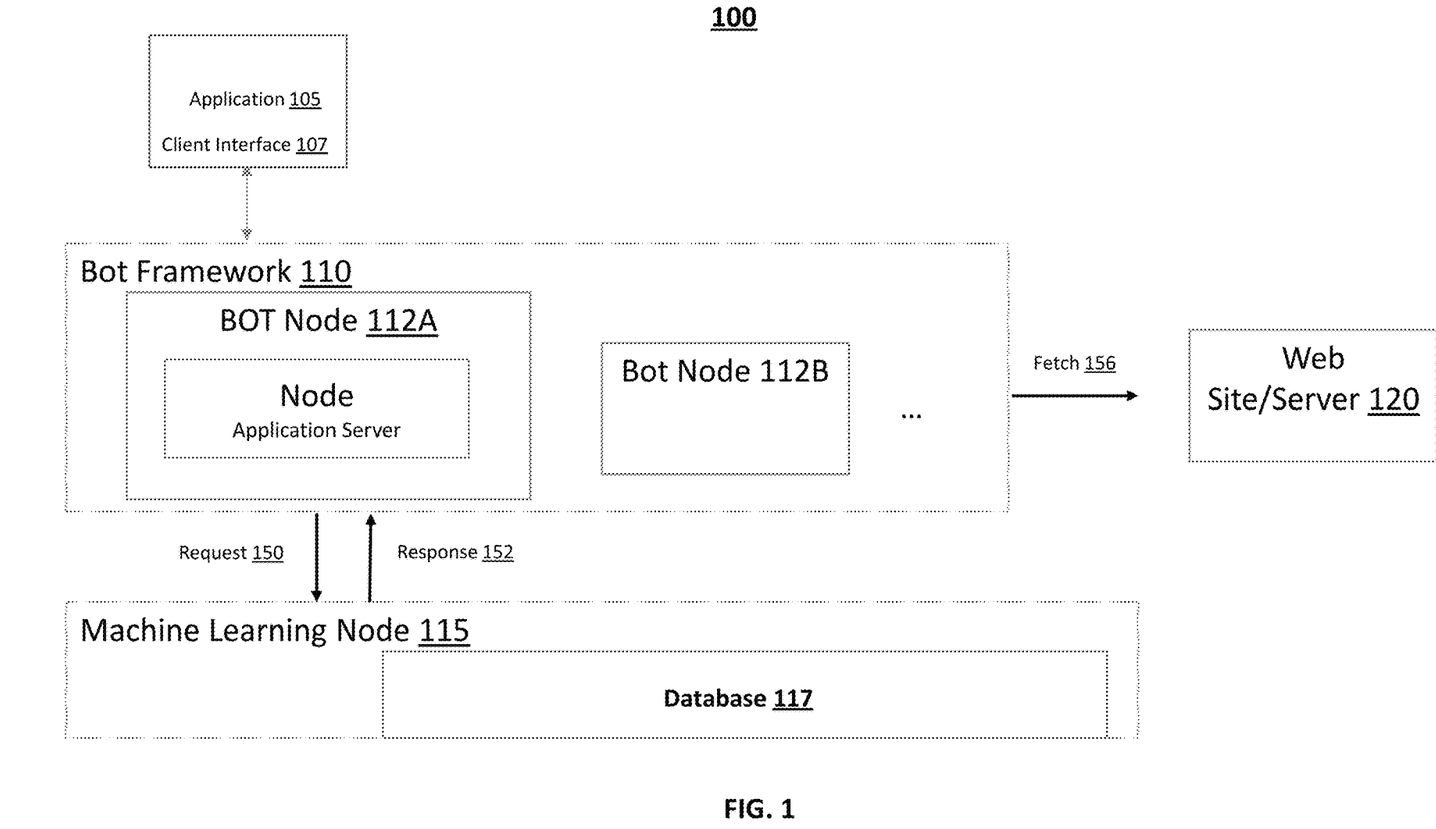
FIG. 1 illustrates an example of a bot framework, in accordance with some example implementations.

FIG. 1 depicts an example of a system 100, in accordance with some example implementations. System 100 depicts an example implementation of the bot framework 110. This bot system 110 may include at least one bot node 112A, 112B, and so forth. The bot node, such as bot node 112A, may be implemented as an application server at a processor, such as a computer, and/or may be implemented as a service, such as a cloud service (accessible at a web-coupled computer via a network such as the Internet).

The bot node 112A may provide an interface at an application, such as application 105. For example, the bot node 112A may be integrated into an application 105 via a client interface 107. The client interface 107 may provide text, chat, email, voice, mobile, and/or other types of interfaces between the application 105 and bot node 112A.

For example, the bot node 112A may provide at application 105 the client interface 107 as a chat interface over which a user of the application 105 may ask questions. To illustrate further, the user may type in a question asking "please list upcoming courses in Java." When that question is typed in, the bot node 112A handles that request and returns the results as a response to the client interface 107 for presentation to the user of application 105. Because the bot node 112A is used, the results are returned without having an intermediate user providing the answer.

Although the previous example illustrates bot node 112A responding to a specific request, the bot node 112A may be configured to respond to a plurality of requests. Moreover, some of the responses to requests may be machine learned as noted further below. Furthermore, although a single application 105 is depicted, the bot nodes can be deployed across a variety of applications, so that the client interface can be accessed by the applications. Alternatively or additionally, different applications can access the bot nodes available in a centrally deployed location. For example, an enterprise system may include a plurality of applications, many of which may include a client interface such as client interface 107 provided by a bot node. Alternatively or additionally, an enterprise system may include a plurality of client applications accessed via various devices which may access a centrally deployed bot node to service a request.

At 150, the bot node 112A may send the request to a machine learning node 115 in order to obtain a response to the request. For example, when the client interface 107 receives the request "please list upcoming courses in Java," the bot node 105 may send at 150 the request to machine learning node 115 for further processing.

In some implementations, the machine learning node 115 may include a database 117. The machine learning node may further include (i) a tokenizer for generating tokens from a text string associated with a request, such as request 150. The database 117 may store (ii) mappings between stored tokens and addresses (e.g., an application programming interface (API), a uniform resource locator (URL), an IP address, or other types of address), and may store (iii) a history of requests and responses.

The machine learning node 115 including the tokenizer may take the phrase of the request received at 150 and generate at least one token for the request. The generated tokens may represent segments of the request. Returning to the previous request example of "please list upcoming courses in Java," the tokenizer at the machine learning node 115 may generate the following tokens "list," "upcoming courses," and "Java."

Next, the machine learning node 115 may search for stored tokens that map to an address from which the answer can be obtained. Returning to the previous example, the machine learning node 115 may have stored token(s) mapped to addresses, such as APIs and the like, from which an answer can be obtained. Here, the machine learning node 115 may search a database 117 for stored tokens that match the generated tokens "list," "upcoming courses," and "Java" (which are generated from the request at 150). If a match is found at database 117, the stored tokens include a mapping to the address, such as an API from which the upcoming course catalog for Java can be obtained.

To illustrate further, the stored tokens may be as follows:
list, upcoming courses, and Java map to API X.
In this example, it is clear that generated tokens from the request match stored tokens in the database 117 exactly.

Suppose however, that the stored tokens at database 117 are as follows:
list, upcoming courses, and Java Virtual Machine map to API X; and
list, upcoming courses, and programming languages map to API Z.
In this example, the generated tokens do not match the stored tokens. In some implementations, the machine learning model 115 may select at least one near match (e.g., by calculating a distance metric between the tokens associated with the request and the stored tokens at database 117). At least one of the near matches may be selected as a possible match and then proposed to the user as a possible match. For example, the machine learning model 115 may propose the alternative "list, upcoming courses, and Java Virtual Machine" to the user of the client interface 107. If the user accepts this near matching alternative, the machine learning node 115 may select the "API X" (which is mapped to list, upcoming courses, and Java Virtual Machine in this example). Moreover, the machine learning node 115 may learn this near matching alternative and add this near match to the stored tokens mapped to addresses contained at the database 117.

At 152, the machine learning node 115 may return to the bot node 112A the address, such as the API "X", along with one or more parameters, such as "Java." Furthermore, the bot node 112A may then access (e.g., make a call, send a message, and/or the like) to the API "X" to fetch, at 156, the list of upcoming Java classes, for example. The machine learning node 115 may then present the results obtained from web site/server 120 in the client interface 107 of application 105.

Figure 2:
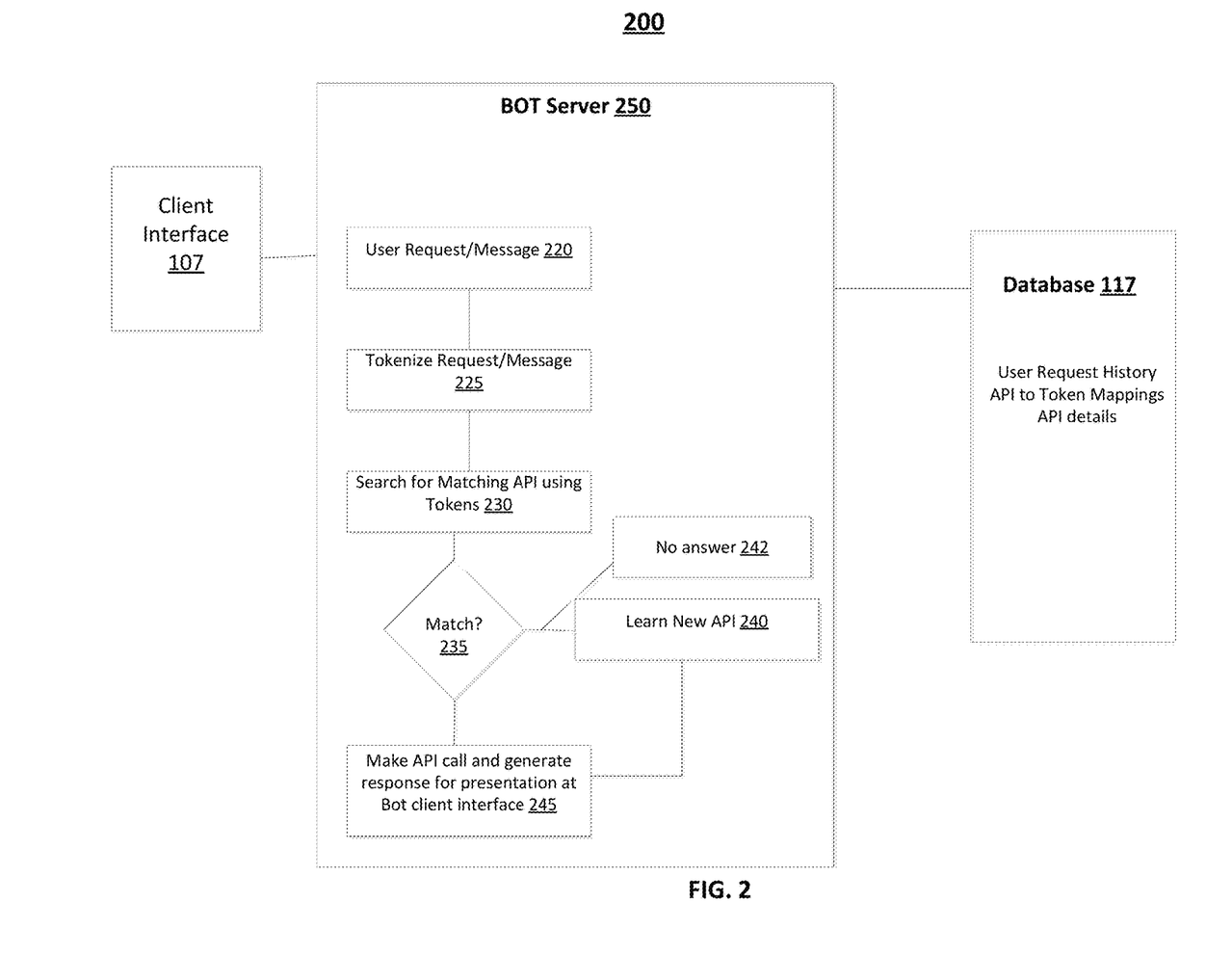
FIG. 2 illustrates an example of a process for a bot framework, in accordance with some example implementations.

FIG. 2 depicts a process 200 of the bot framework, in accordance with some implementations.

The bot's client interface 107 may provide an interface at which a user may type in a request, such as a question. For example, the bot client interface 107 may be implemented as part of the application 105 to provide a chat, a short message service, an email, or other text-based interface. Alternatively or additionally, a user may speak the question, in which case a speech-to-text converter may form the question. The client interface 107 may forward the request to the bot server 250.

The bot server 250 may be implemented as at least one processor and at least one memory including program code which when executed causes the bot server 250 disclosed herein to be provided. The bot server may include at least one bot node, such as bot nodes 112A, 112B, and so forth. The bot server may be implemented as a service, such as a cloud service accessible via the Internet.

At 220, the bot server 250 may receive, for handling by a bot, the request provided by the bot's client interface 107. This request may be received in the form of a message, such as a text message including a string of text.

Figure 3:
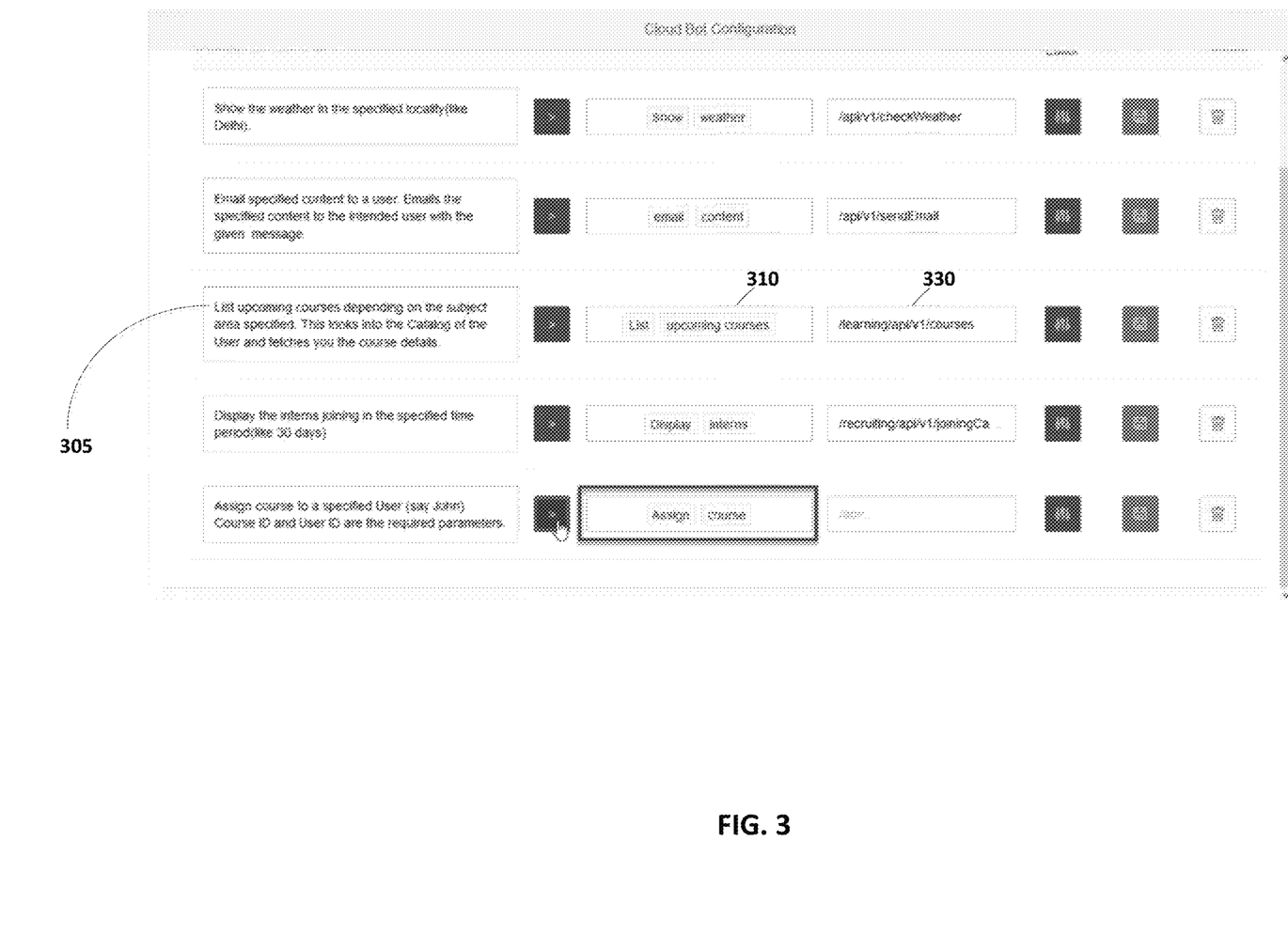
FIGS. 3 and 4 show examples of tokenized request mapped to address, in accordance with some example implementations.

At 225, the bot server 250 may take the request and tokenize the request. The tokenization of the request may reduce the processing burden on the bot server with respect to finding a matching address, such as an API, when compared to using the entire request's string. Although the tokenization can be performed in a variety of ways, the tokenization may segment the string into text elements, such as one or more words while taking into account grammar, syntax and the user's sentiment. The tokenization may also include a filtering function that removes some of the less necessary tokens. FIG. 3 depicts the text string of the request 305 and the tokens 310 generated by the tokenizer. FIG. 3 also depicts at 330 the API mapped to the tokens 310. The database 117 may store the tokens 310 that are mapped to API 330 as well as with other tokens mapped to APIs.

Referring again to FIG. 2, the bot server 250 may then search, at 230, for stored tokens at database 117 that match the tokenized request. For example, the request may be tokenized into "List" and "upcoming courses." The bot server 250 may then search database 117 for matching tokens. Referring to the example of FIG. 3, the stored tokens 310 may include "List" and "upcoming courses," which may map to the API 330 (e.g., /learning/api/v1/courses). As such, the bot server 250 may be able to find an exact match at 310.

If an exact match is found between the tokens of the request and the stored tokens at database 117 (which are mapped to an address), then the bot server 250 (or machine learning node 115 therein) may select the address and access the address to obtain the data from the destination identified by the address (yes at 235 and 245). For example, the bot server 250 (which may include as node machine learning node 115) may search database 117 for stored tokens matching the token request "List" and "upcoming courses." As noted, if there is an exact match at 305/310, the bot server/machine learning node may select the API information 330, and then access the location identified by the API information 330 to obtain the list of upcoming courses, for example. The obtained data may then be presented at the bot's client interface 107 as an answer to the original user request received at 220.

If an exact match is not found between the tokens of the request and the stored tokens at database 117, the bot server 250 (which may include machine learning node 115) may return an indication to the bot's client interface 107 that the bot server 250 is not able to answer the request (no at 235 and 242).

If an exact match is not found between the tokens of the request and the stored tokens at database 117, the bot server 250 (which may include machine learning node 115) may attempt to learn a response, such as an answer to the request, by proposing an alternative from a near matching token stored at database 117 and making a call to an API mapped to the near matching token (no at 235 and 240). As noted above, if the tokens of the request are a near match to one or more of the stored tokens at database 117, the bot server 250/machine learning node 115 may select the address of the near matching stored token at database 117 and access the address at 245 to obtain the data from the destination identified by the address of the near matching token. In the case of a near match, the bot server 250/machine learning node 115 may present, at client interface 107, a response including the obtained data and a query asking, for example, "Is this responsive to your original question or request?" If the user indicates yes at client interface 107, the bot server 250/machine learning node 115 may store a mapping from the request tokens to the stored tokens and address which were an acceptable near match. If the user indicates no at client interface 107, the bot server 250/machine learning node 115 may select, from database 117, another alternative near matching token and propose it to the user as noted above, although the bot server 250/machine learning node 115 may instead generate a response for client interface 107 that indicates no answer as noted at 242.

Figure 4:
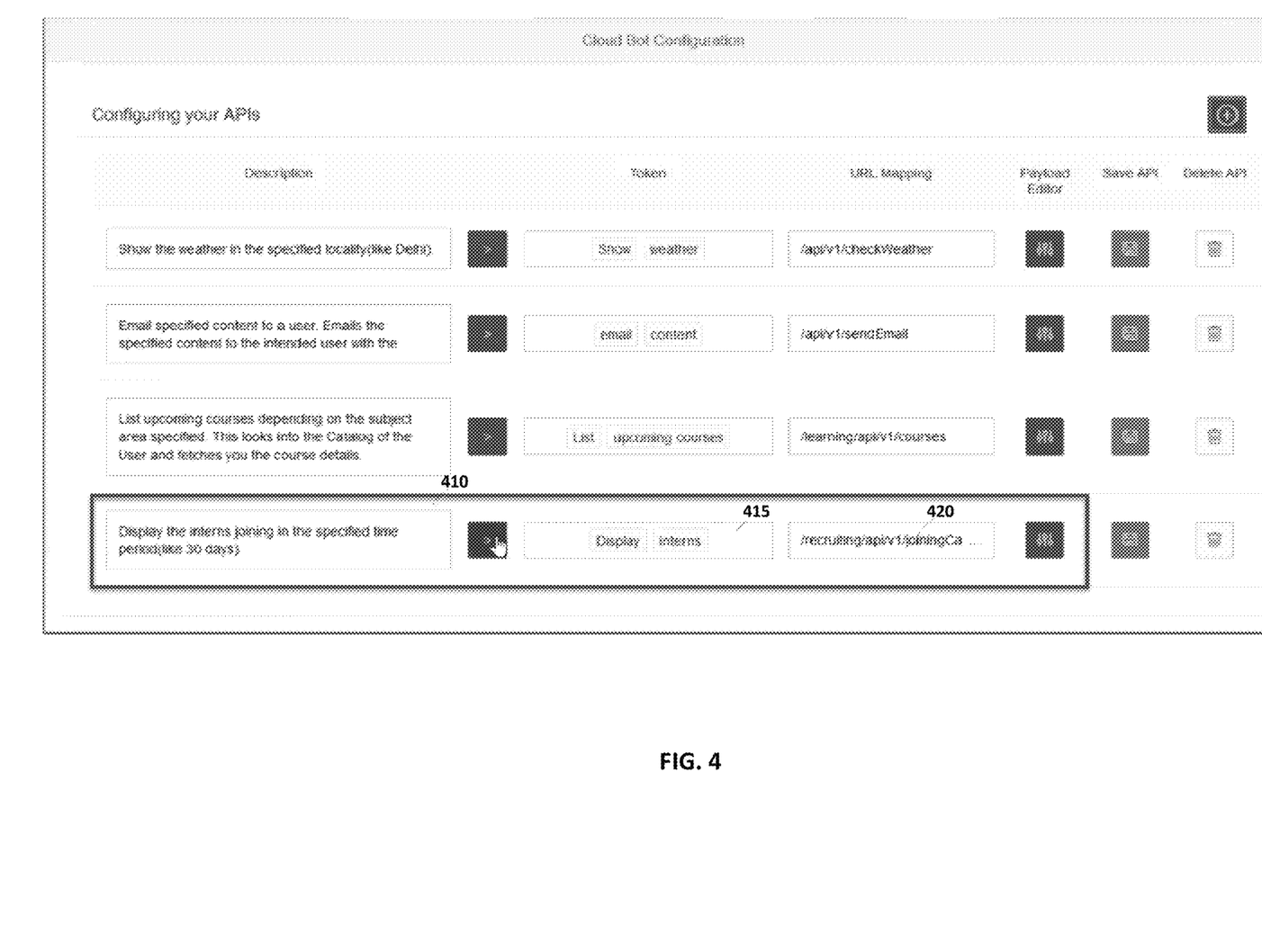

FIG. 4 depicts at 410 another request in the form of a text string that has been tokenized at 415 and mapped to an address 420. The token 415 and the address 420 may be stored at database 117 and searched in order to find matching tokens as noted above. The tokens may include other aspects as well include sentiment (e.g., whether the text string relates to anger, joy, excitement, confusion, and/or the like) and language (e.g., what language the text string is in).

Figure 5A:
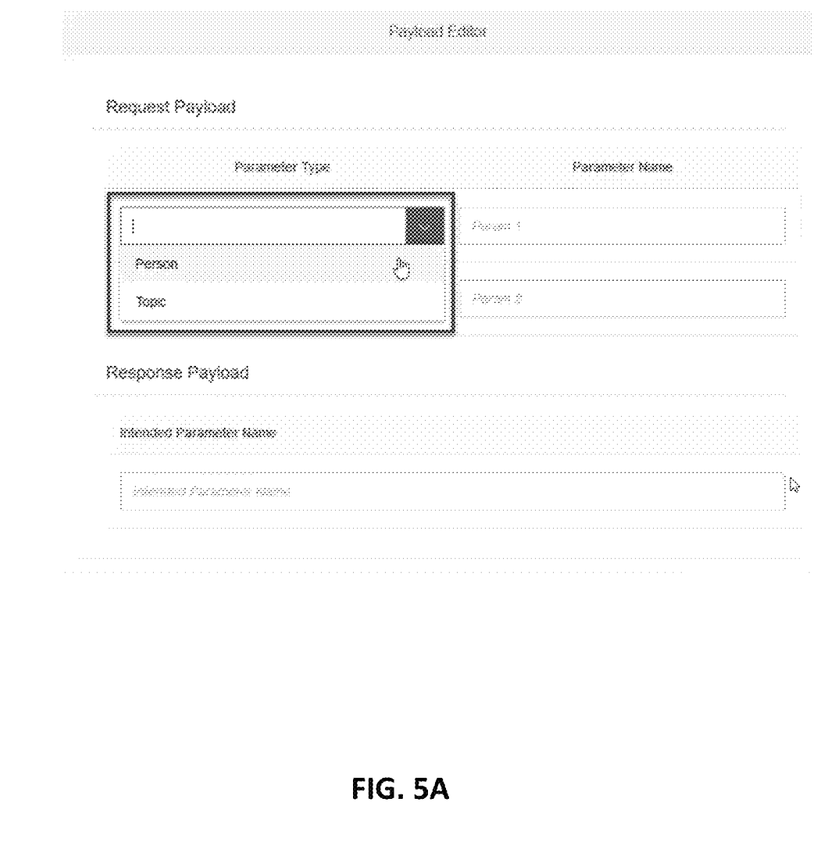
FIGS. 5A and 5B show examples of how the request and the response are configured, in accordance with some example implementations.
Figure 5B:
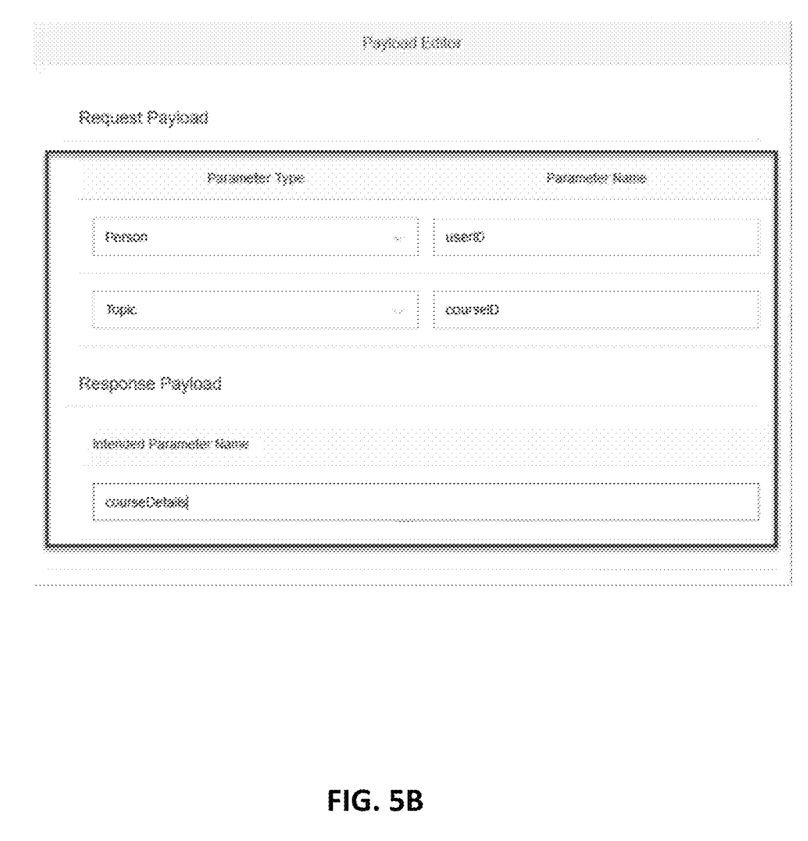

FIGS. 5A-5B depict payload editors. The payload editors may be used to format the fetch request sent at 156 and to format the response received from the web site/server 120.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:
1. A method comprising:
receiving a request comprising a text string for handling by a bot;
generating, from the request, at least one token by tokenizing at least a portion of the request into the at least one token;
determining whether the at least one token matches at least one stored token mapped to an address identifying a location including an answer to the request, the determining including searching a database storing
tokens mapped to addresses;
in response to the match between the at least one token
and the at least one stored token,
  selecting the address,
  accessing, at the selected address, data to enable presentation, at a client interface associated with the bot, the data obtained at the selected address in order to provide a response to the request; and
in response to not having the match between the at least one token and the at least one stored token,
  learning an alternative answer by selecting an alternative address mapped to at least one near matching token stored in the database, the at least one near matching token determined based on a distance metric between the at least one token and the at least one near matching token stored in the database,
  storing, in response to a confirmation received from the client interface associated with the bot, the at least one near matching token as an acceptable match to the at least one token, and
  accessing, at the alternative address, alternative data to enable presentation, at the client interface associated with the bot, the alternative data obtained at the alternative address in order to provide the response to the request.

2. The method of claim 1, wherein the learning is performed by a machine learning node coupled to the bot, the machine learning node further coupled to the database storing the stored tokens mapped to the addresses.

3. The method of claim 1 further comprising:
presenting, at the client interface associated with the bot, the alternative data; and
presenting, at the client interface associated with the bot, an indication which when selected provides the confirmation indicative of the alternative data being responsive to the request.

4. The method of claim 3, wherein the learning is triggered by the indication being selected at the client interface.

5. A system comprising:
at least one processor; and
at least one memory including program code which when executed by the at least one processor causes operations comprising:
receiving a request comprising a text string for handling by a bot;
generating, from the request, at least one token by tokenizing at least a portion of the request into the at least one token;
determining whether the at least one token matches at least one stored token mapped to an address identifying a location including an answer to the request, the determining including searching a database storing tokens mapped to addresses;
in response to the match between the at least one token and the at least one stored token,
  selecting the address, and
  accessing, at the selected address, data to enable presentation, at a client interface associated with the bot, the data obtained at the selected address in order to provide a response to the request; and
in response to not having the match between the at least one token and the at least one stored token,
  learning an alternative answer by selecting an alternative address mapped to at least one near matching token stored in the database, the at least one near matching token determined based on a distance metric between the at least one token and the at least one near matching token stored in the database,
  storing, in response to a confirmation received from the client interface associated with the bot, the at least one near matching token as an acceptable match to the at least one token, and
  accessing, at the alternative address, alternative data to enable presentation, at the client interface associated with the bot, the alternative data obtained at the alternative address in order to provide the response to the request.

6. The system of claim 5, wherein the learning is performed by a machine learning node coupled to the bot, the machine learning node further coupled to the database storing the stored tokens mapped to the addresses.

7. The system of claim 5 further comprising:
presenting, at the client interface associated with the bot, the alternative data; and
presenting, at the client interface associated with the bot, an indication which when selected provides the confirmation indicative of the alternative data being responsive to the request.

8. The system of claim 6, wherein the learning is triggered by the indication being selected at the client interface.

9. A non-transitory computer-readable storage medium including program code which when executed by at least one processor causes operations comprising:
receiving a request comprising a text string for handling by a bot;
generating, from the request, at least one token by tokenizing at least a portion of the request into the at least one token;
determining whether the at least one token matches at least one stored token mapped to an address identifying a location including an answer to the request, the determining including searching a database storing tokens mapped to addresses;
in response to the match between the at least one token and the at least one stored token,
  selecting the address,
  accessing, at the selected address, data to enable presentation, at a client interface associated with the bot, the data obtained at the selected address in order to provide a response to the request; and
in response to not having the match between the at least one token and the at least one stored token,
  learning an alternative answer by selecting an alternative address mapped to at least one near matching token stored in the database, the at least one near matching token determined based on a distance metric between the at least one token and the at least one near matching token stored in the database,
  storing, in response to a confirmation received from the client interface associated with the bot, the at least one near matching token as an acceptable match to the at least one token, and
  accessing, at the alternative address, alternative data to enable presentation, at the client interface associated with the bot, the alternative data obtained at the alternative address in order to provide the response to the request.

10. The non-transitory computer-readable storage of claim 9, wherein the learning is performed by a machine learning node coupled to the bot, the machine learning node further coupled to the database storing the stored tokens mapped to the addresses.

11. The non-transitory computer-readable storage of claim 9 further comprising:
- presenting, at the client interface associated with the bot, the alternative data; and
- presenting, at the client interface associated with the bot, an indication which when selected provides the confirmation indicative of the alternative data being responsive to the request.

\* \* \* \* \*